United States Patent [19]
Mills

[11] 3,935,849
[45] Feb. 3, 1976

[54] FUEL VAPORIZING DEVICE FOR AN INTERNAL COMBUSTION ENGINE OR GAS TURBINE

[75] Inventor: Walter D. Mills, Mold, Wales

[73] Assignee: Shell Oil Company, Houston, Tex.

[22] Filed: Sept. 3, 1974

[21] Appl. No.: 502,263

[30] Foreign Application Priority Data
Sept. 11, 1973 United Kingdom............... 42636/73

[52] U.S. Cl. ............................ 123/122 AA; 165/105
[51] Int. Cl.² .......................................... F02M 31/00
[58] Field of Search .................. 123/122 AA, 122 R; 165/105

[56] References Cited
UNITED STATES PATENTS

| | | | |
|---|---|---|---|
| 1,846,955 | 2/1932 | Dow..................................... | 165/105 |
| 3,217,792 | 11/1965 | Montebone.......................... | 165/105 |
| 3,682,237 | 8/1972 | Islo ...................................... | 165/105 |
| 3,763,838 | 10/1973 | Lindsay et al................. | 123/122 AA |

*Primary Examiner*—Charles J. Myhre
*Assistant Examiner*—R. H. Lazarus
*Attorney, Agent, or Firm*—Ronald R. Reper

[57] ABSTRACT

A device is disclosed for vaporing liquid fuel before introduction into a combustion chamber comprising a heat pipe containing heat transfer fluid communicating with additional fluid external to the heat pipe.

10 Claims, 1 Drawing Figure

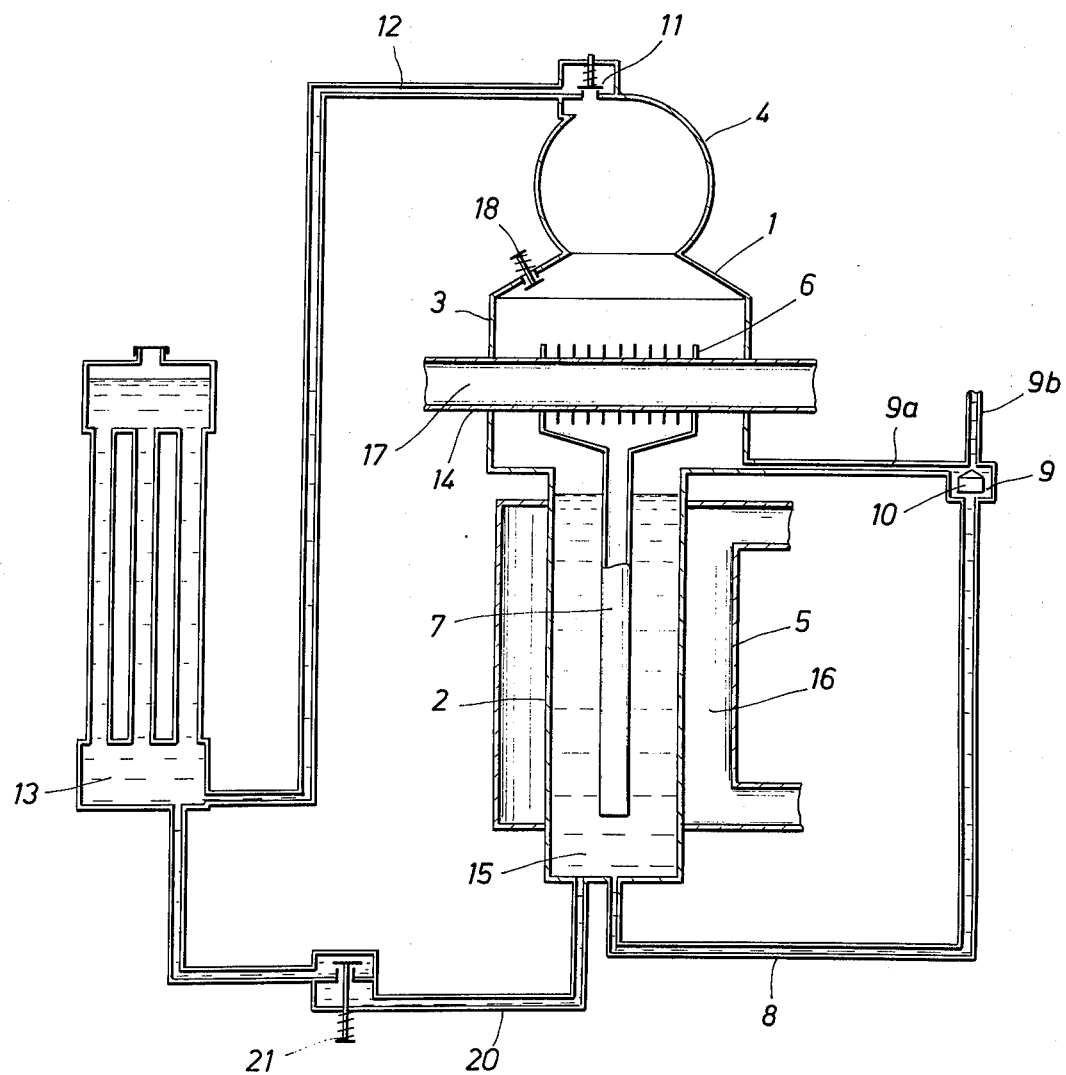

FUEL VAPORIZING DEVICE FOR AN INTERNAL COMBUSTION ENGINE OR GAS TURBINE

BACKGROUND OF THE INVENTION

The present invention relates to an improved fuel vaporizing apparatus suitable for vaporing the liquid fuel or fuel-air charge for an internal combustion engine or gas turbine prior to its introduction into said engine or gas turbine, comprising such an apparatus and to automotive vehicles which comprise such an internal combustion engine or gas turbine having said apparatus.

The conventional spark-ignition engine relies on a carburetor to mix a desired proportion of a volatile fuel with the inlet air. For complete combustion of the fuel-air mixture the fuel needs to be uniformly dispersed in the air. Such a uniform mixture is seldom if ever obtained in practice with a conventional carburetor, and manifold fuel injection offers only marginal improvement.

In the conventional gas turbine a uniform fuel-air mixture (and uniform turbine entry temperature) is equally hard to achieve.

According to the inventions disclosed in U.S. Pat. No. 3,763,838 and U.S. patent applications Ser. No. 461,180 filed Apr. 15, 1974 and Ser. No. 461,174 filed Apr. 15, 1974, fuel vaporizing devices suitable for vaporizing the liquid fuel charge for an internal combustion engine or gas turbine prior to its introduction into said engine or gas turbine, and prior to or after mixing of the fuel with the main stream of combustion air, comprise one or more heat pipes, each of which is in the form of a sealed vessel containing a heat transfer fluid and is so constructed that in operation the heat transfer fluid in the said heat pipe or heat pipes is evaporated in the so-called heat-receiving zone of the heat pipe by heat received from the exhaust gases of the said engine or of the said gas turbine, and condensation of the said evaporated heat transfer fluid takes place by discharging heat for the evaporation of fuel to be combusted in the so-called fuel vaporizing zone of the heat pipe where the fuel is vaporized.

The use of one or more heat pipes enables heat to be supplied to the fuel or fuel-air mixture within a restricted temperature range virtually regardless of the rate at which the fuel is demanded. Furthermore, at start-up the heat pipe or pipes reach their operating temperature very much more quickly than a solid heat conductor.

The heat transfer fluid present in said heat pipe or pipes preferably has a boiling point at atmospheric pressure up to 400°C.

As the heat demanded from the heat pipe can vary considerably, surplus heat can be removed by additional cooling means. These can, e.g., consist of a honeycomb or a multitubular condenser in the upper part of the heat pipe which, e.g., is cooled with the aid of the cooling system of the engine. When additional cooling means are used a separate return line is advantageously provided for returning heat transfer fluid condensed by these means to the liquid bulk of that fluid in the heat pipe, without contacting this condensed heat transfer fluid with the fuel vaporizing section or the rising vapor of the heat transfer fluid. It is also possible to cool the upper part of the heat pipe itself by circulating coolant from the cooling system of the engine therethrough. Air may also be used as additional cooling agent.

The additional cooling means discussed do not show a great flexibility and may not be able in all cases to accept sufficient heat from the vapor of the heat transfer fluid to condense such an amount of the latter vapor that no undesired high pressure in the heat pipe is built up.

Moreover leakages in the heat pipe through which heat transfer fluid is removed therefrom are not easily discerned in the heat pipe systems proposed hitherto.

Furthermore, it is considered as a drawback that in the known devices two liquid-containing systems are present in one engine, viz the cooling system and the heat pipe, which are not connected with each other.

SUMMARY OF THE INVENTION

The present invention provides a fuel vaporizing apparatus in which the above-mentioned disadvantages have been overcome.

Accoding to the invention there is provided a device for vaporizing liquid fuel prior to its introduction into a combustion chamber of an internal combustion engine or a gas turbine which comprises a heat pipe vessel containing a heat transfer fluid, said heat pipe having heat recovering zone and a heat discharging zone, said heat receiving zone which contains said fluid in liquid phase is optionally engaged with the exhaust system of the engine or gas lines, to collect heat from said exhaust system; said heat discharging zone which contains said fluid in a vapor phase is in communication with said heater receiving zone and is operationally engaged with said fuel inlet system to condense the vapor phase of the fluid to transfer heat to the fuel to be evaporated; vapor removal means operationally engaged with said heat discharge zone to remove excess of the vapor phase from said heat pipe; fluid supply means operationally engaged with said heat receiving zone to supply make-up heat transfer fluid in the liquid phase to said heat receiving zone.

According to a preferred embodiment of the invention vapor phase of the heat transfer fluid in excess of that condensed in the heat discharging zone also referred to hereinafter as a fuel vaporizing section of the said heat pipe is removed from said heat discharging zone by way of a pressure-sensitive non-return valve.

It is preferred that means are present for condensing the excess vapor phase of the heat transfer fluid removed from the heat pipe, so that the heat transfer fluid removed can be recirculated to the heat pipe if so desired.

DESCRIPTION OF PREFERRED EMBODIMENTS

Very suitably said means for condensing the excess vapor phase of the heat transfer fluid removed from the heat pipe consist of the conventional cooling system of the engine or gas turbine. This condensation may be achieved by indirect contact between the liquid present in the said cooling system and the vapor of the heat transfer fluid. It is preferred, however, that the excess vapor phase of the heat transfer fluid removed from the heat pipe is condensed by direct contact with the liquid in the cooling system of the engine or gas turbine. This cooling may be achieved by leading the vapor of the heat transfer fluid into the cooling liquid present in the cooling system. In this case the cooling liquid of the engine or the gas turbine and the liquid phase of the heat transfer fluid will consist of the same components, although it is possible that their composition is not exactly the same, and for example lower boiling components are present in higher concentration in the cooling liquid than in the heat transfer liquid.

Means for supply of make-up transfer fluid in the liquid phase are to be present in the heat pipe, in order to be able to make good loss of heat transfer fluid that is removed in the vapor phase. Very suitably the supply of heat transfer fluid in the liquid phase is governed by a float-controlled feed system. The heat transfer liquid may be supplied from a reservoir to which the condensed vapor phase of the heat transfer fluid removed from the heat pipe may be fed. It is preferred that the said reservoir is the cooling system of the engine or gas turbine, so that liquid is supplied from the cooling system of the engine or gas turbine to the heat pipe. If desired the make-up heat transfer fluid may be transported with the aid of the pump of the cooling system of the engine or gas turbine.

When the heat pipe is at running temperature the pressure therein is dependent on the pressure of the vapor phase of the heat transfer fluid at that temperature. When the engine or gas turbine is stopped the temperature of the heat transfer fluid will decrease, and the vapor phase thereof will at least partly condense in the heat pipe. Accordingly, the pressure in the heat pipe will drop, and means are to be present to avoid that the heat pipe is filled with heat transfer fluid in the liquid form supplied via the means for supply of make-up heat transfer fluid in the liquid phase (e.g., a float-controlled feed system). For that reason very suitably the heat pipe contains means for introduction of air, which means are governed by the pressure in the heat pipe, and preferably consist of a pressure-sensitive non-return valve in the heat discharging zone of the heat pipe.

In case the cooling system of the engine or gas turbine and the heat pipe are interconnected, and the excess vapor of the heat transfer fluid removed from the heat pipe is condensed by direct contact with the cooling liquid and the make-up supply of heat transfer fluid consists of cooling liquid, problems may arise in case the cooling liquid comprises two compounds with different boiling points. In the heat pipe the vapor of the heat transfer fluid will be enriched in the component with the lower boiling point, and accordingly the liquid in the heat pipe will be enriched in the component with the higher boiling point. This may lead to insufficient formation of vapor in the heat pipe, and accordingly to an insufficient transport of heat from the heat receiving zone to the heat discharging zone to vaporize the fuel. Therefore it is preferred that means are present for transporting heat transfer fluid in the liquid phase from the heat pipe to the cooling system of the engine or gas turbine, so that the liquid phase of the heat transfer fluid has approximately the same composition as the cooling liquid. This means very suitable comprise a conduct which contains a one-way, i.e., non-return valve.

It is of advantage that the cooling system of the engine or gas turbine which is connected to the heat pipe is a sealed radiator system, so that the liquid present in the heat pipe and in the cooling system has a substantially constant composition.

Examples of suitable heat transfer fluids or components thereof are 2-octanol, decane, tetralin and water, the latter having the advantage of low cost and ready availability. Water has a boiling point within the preferred range and, especially with the addition of a suitable stable anti-freeze material, an acceptable freezing point. For that reason heat transfer fluids which consist for at least 50%w of water are preferred. Alcohols are very suitable as anti-freeze material, and accordingly very suitable heat transfer fluids substantially consist of a mixture of water and ethylene glycol or of a mixture of water and methanol. It will be understood that other compounds, such as anti-corrosion additives and anti-oxidants, may be present in the heat transfer fluid in minor amounts.

The invention also relates to an internal combustion engine (particularly a spark-ignition engine) or a gas turbine which comprises a device as described hereinbefore.

In order to be able to control the supply of heat to the heat pipe it is of advantage to have means available which regulate amount of the exhaust gases which is contacted with the heat-receiving zone of the heat pipe. This may be achieved by by-passing part of the exhaust gases which may be accomplished with the aid of e.g., a diverter valve in the exhaust system, which very suitably is controlled automatically by known methods dependent on, for example, the pressure in the heat pipe, or the position of the throttle in the inlet system or the temperature of the exhaust gas.

If desired additional cooling means may be present in the heat pipe.

In order to keep the amount of noxious compounds in the exhaust gases, which mainly consist of CO, nitrogen oxides ($NO_x$) and hydrocarbons, as low as possible, it is of advantage to run a spark-ignition engine on weak mixtures, or in other words to use an amount of air in excess of the amount neded for the total combustion of the fuel to $CO_2$ and $H_2O$. By doing so less power is obtained from the engine as compared when running it with optimum amounts of fuel and air. To increase the power output the inlet system very suitably contains a compressor (also called supercharger). This compressor may be present in the system downstream of the point where part or all of the combustion air and the fuel have been mixed, but it is preferred that the supercharger compresses the main air stream before it is mixed with the fuel.

It is of advantage, in order to avoid misfiring with the weak fuelair mixtures that are preferably used, that near the inlet of each cylinder an adjustable valve for bleeding in air is present as described in British Patent Application 18751/73. If desired water or steam may be injected into the cylinders.

It is of advantage to have means available for vaporizing the fuel at cold start when the temperature and the amount of the exhaust gases are not yet sufficient to bring the heat pipe at running temperature. The said means may comprise additional heating means for the fuel or for all or part of the heat transfer fluid in the heat pipe, and the said additional heating means may consist, e.g., of electrical heating means fed by the battery of the engine.

The invention will now be further described by way of example with reference to the accompanying drawing which shows in diagrammatic form a vaporizing device according to the present invention.

The fuel vaporizing device shown in the drawing comprises a heat pipe 1 in the form of a vessel having a lower heat-receiving zone 2 and an upper heat discharging zone, i.e., fuel vaporizing section 3. A vapor dome 4 is positioned in open contact with the said fuel vaporizing section 3 and a conduit 5, adapted to contain hot exhaust gases, surrounds the said heat-receiving section 2. A condensing/collecting means 6 is mounted within the fuel vaporizing section 3 and is connected by a return pipe 7 to the heat-receiving section 2. A small bore conduit 8 leads from the lower part of the heat-receiving section 2 to a float chamber 9 containing a float 10. The upper part of the float chamber 9 and the lower part of the fuel vaporizing section 3 are interconnected by a very small bore pressure equalizing pipe 9a. A liquid heat transfer fluid inlet pipe 9b which is connected to the cooling system of the engine also opens into the chamber 9.

Mounted on the vapor dome 4 is a pressure-operated non-return valve 11 opening into a conduit 12 which leads to the cooling system of the engine, viz the radiator of the engine 13.

A fuel vaporization duct 14 passes through the fuel vaporizing section 3 in heat exchange contact with the said section 3 and the condensing/collecting means 6.

In operation, heat transfer liquid 15 contained in the heatreceiving section 2 is converted to vapor by means of heat received from the hot exhaust gases 16 passing through the conduit 5, connected to the engine exhaust system, not shown. In the fuel vaporizing section 3 fuel or fuel-air mixture 17, in the fuel vaporizing duct 14 is vaporized by means of heat obtained by transfer from the said vapor.

Liquid heat transfer fluid formed by the condensation of the vapor is collected by the condensing/collecting means 6 and returned by the return pipe 7 to the liquid 15 in the heat-receiving section 2.

Vapor not condensed in the fuel vaporizing section 3 passes into the vapor dome 4. Excess vapor in the vapor dome 4 is allowed to escape through the pressure-operated non-return valve 11 into the conduit 12 through which it is introduced into the cooling system of the engine 13.

The liquid level within the heat-receiving section 2 is maintained by means of a supply from the float chamber 9 through the conduit 8. The float chamber 9 receiving a supply through the pipe 9b connected to the pressure side of the engine cooling liquid supply pump, not shown. Through a non-return valve 18 air can enter the vaporizing sections when the engine is shut down and the pressure in the heat pipe decreases owing to condensation of the vapor of the heat transfer fluid. The liquid phase of the heat transfer fluid can be transported through conduit 20 via a non-return valve 21 to the liquid present in the cooling system of the engine 13.

What is claimed is:

1. In combination: (1) a combustion chamber-containing apparatus selected from the group consisting of an internal combustion engine and a gas turbine, (2) a device for vaporizing liquid fuel prior to its introduction into the combustion chamber of said apparatus, which device comprises a heat pipe vessel containing a heat transfer fluid, said heat pipe having a heat recovering zone and a heat discharging zone, said heat recovering zone which contains said fluid in liquid phase is operationally engaged with the exhaust system of said apparatus, to collect heat from said exhaust system; said heat discharging zone which contains said fluid in a vapor phase is in communication with said heat receiving zone is operationally engaged with the fuel inlet system of said apparatus to condense the vapor phase of the fluid to transfer heat to the fuel to be evaporated; (3) vapor removal means operationally engaged with said heat discharge zone to remove excess of the vapor phase from said heat pipe; and (4) fluid supply means communicating with a reservoir of said heat transfer fluid operationally engaged with said heat receiving zone to supply make-up heat transfer fluid in the liquid phase to said heat receiving zone.

2. A combination as in claim 1, in which the means for the removal of excess of the vapor phase of the heat transfer fluid consists of a pressure-sensitive non-return valve.

3. A combination as in claim 1, in which condensing means are operationally engaged to vapor removal means for condensing the phase of the heat transfer fluid removed from the heat pipe.

4. A combination as in claim 3, in which the said condensing means consist of the cooling system of said combustion chamber-containing apparatus.

5. A combination as in claim 1, in which the supply means comprises a float-controlled feed system.

6. A combination as in claim 1, in which the heat pipe contains air introduction means for introduction of air.

7. A combination as in claim 1, in which the said means consist of a pressure-sensitive non-return valve in the heat discharging zone of the heat pipe.

8. A combination as in claim 1, in which the make-up heat transfer fluid in the liquid phase is supplied from the cooling system of said combustion chamber-containing apparatus.

9. A combination as in claim 8, in which conduit means communicating the heat pipe with the cooling system of said combustion chamber-containing apparatus are present for transporting heat transfer fluid in the liquid phase from the heat pipe to the cooling system.

10. A combination as in claim 1, in which the heat transfer fluid consists of at least 50%w of water.

* * * * *